May 21, 1968 F. SCHNEIDER Re. 26,395

PICTURE BOOK

Original Filed May 11, 1964

INVENTOR

*Friedrich Schneider*

Kolb and Ward
Atty

United States Patent Office

Re. 26,395
Reissued May 21, 1968

26,395
PICTURE BOOK

Friedrich Schneider, Maximilianplatz 9,
Munich, Germany

Original No. 3,257,128, dated June 21, 1966, Ser. No. 366,344, May 11, 1964. Application for reissue Dec. 23, 1966, Ser. No. 606,507
Claims priority, application Germany, June 25, 1963, Sch 33,456
5 Claims. (Cl. 281—39)

Matter enclosed in heavy brackets [ ] appears in the original patent but forms no part of this reissue specification; matter printed in italics indicates the additions made by reissue.

This invention relates to picture books, and more particularly to a picture book for very young children.

Because of the normal conditions under which such picture books are used, they should resist wear and tear, and are preferably capable of being cleaned with water and soap. Any object to be handled by a very young child should be safe under all conceivable circumstances.

The primary object of the invention is the provision of a picture book which meets the above requirements. An additional objects is the provision of a picture book which is soft and pliable enough not to injure a child, yet of such structure that pages tend to present flat picture carrying surfaces.

With these and other objects in view, the invention, in one of its aspects, provides a book having a plurality of pages. Each page has two facing members of pliable foil material, substantially impervious to water, and a core member of resiliently compressible plate material interposed between the facing members. The pages are hingedly connected for movement relative to each other.

Other features and the attendant advantages of this invention will become apparent from the following detailed description of a preferred embodiment when taken with the appended drawing in which.

Figure 1:
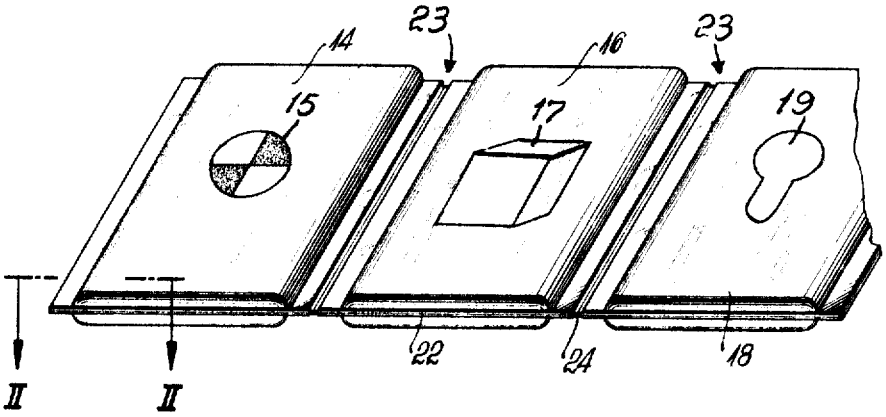
FIG. 1 shows a book of the invention in fragmentary perspective view.

Referring now to the drawing in detail, there are seen three pages 14, 16, 18 of a picture book. The book essentially consists of two elongated foils 10, 12 of pliable waterproof plastic, such as plasticized polyvinyl chloride, and several rectangular plates 20 of foamed rubber or plastics, such as polyurethane plastic.

The two foils 10, 12 are superimposed in each page on the opposite major faces of the corresponding plate 20 so as to form a laminar structure in which the plate 20 constitutes a core faced by the foil material. The foils 10, 12 are wider than the corresponding dimensions of the plates 20, and the plates are spaced from each other in the direction of elongation of the foils. The projecting rim portions of the two foils in each page are bonded to each other so as to form two longitudinal seals 22 and two transverse, sealed hinges 23 associated with each page and extending from one seat 22 to the other.

Figure 2:
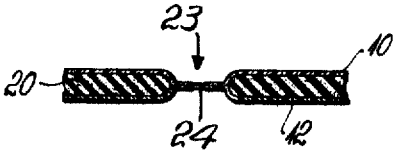
FIG. 2 shows a portion of the book of FIG. 1 in elevational section on the line II—II.
Figure 3:
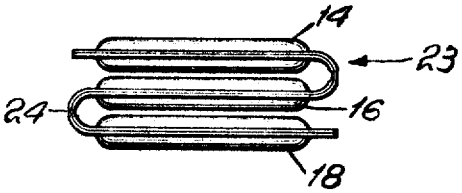
FIG. 3 is an elevational side view of the book of FIG. 1 in the folded condition.

As better seen in FIG. 2, the foils 10, 12 are of uniform thickness except along a crease 24 where they are reduced in thickness. Each foil thus has longitudinally alternating facing and hinge portions. The hinge portions are bonded to each other and include parts of reduced thickness along the crease 24 which extends over the full width of the book. The creases facilitate folding of the book in accordion fashion as illustrated in FIG. 3.

The three substantially identical pages 14, 16, 18 carry respective image imprints of a ball 15, a cube 17, and of a rattle 19. These are merely illustrative of the objects whose pictorial representations are usually incorporated in picture books for the very young.

In making a picture book of the invention, the image imprints are first applied to one or both of the foils 10, 12 by screen printing or any other suitable method not in itself relevant to this invention. The several plates 20 are then positioned on the blank face of one of the foils in longitudinally spaced relationship, and the other foil is superimposed on the plates. The foils 10, 12 are then bonded to each other about each plate 20, preferably by welding, thereby sealing each plate in a conforming pocket of pliable material impervious to water.

The welded double layer of foil material between two adjacent plates 20 constitutes the hinge element of the book. The creases 24 may be formed during welding by heat and pressure, or they may be formed in a separate operation.

The picture books of the invention are virtually indestructible by means available to their normal users. They are readily cleaned by washing. The cellular core of each page is sufficiently compressible to permit some deformation of the page, and thus to avoid injury to a child upon impact, but the resilience of the core tends to restore the normal flat shape of each page.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What I claim is:

1 A washable children's picture book comprising, in combination:

(a) two superposed elongated foil members of pliable material substantially impervious to water, said foil members having longitudinally alternating face portions and hinge portions;

(b) at least three substantially identical plate-shaped core members of resilient, soft and pliable foam rubber or foam plastic, (1) each core member being interposed between respective face portions of said foil members and longitudinally spaced from the other core members, (2) the respective hinge portions of said foil members being bonded to each other longitudinally intermediate said core members, (3) said foil members having respective rim portions projecting from said face portions transversely of the direction of elongation of said foil members, (4) the rim portions of one foil member being bonded to the rim portions of the other foil member, whereby the bonded hinge and rim portions jointly constitute a seal between said foil members about each core member; and (c) an image imprint on each face portion.

2. A book as set forth in claim 1, wherein said face portions and respective parts of each hinge portion adjacent said face portions are of substantially uniform thickness, and a part of each hinge portion elongated transversely of said direction of elongation is of reduced thickness.

*3. A washable children's picture book essentially consisting of at least three laminar pages of substantially identical size and shape, each page comprising two face portions, a core portion interposed between said two*

*face portions, and an image imprint exposed on each of said face portions,*

*(1) said face portions constituting respective longitudinally spaced integral parts of two superposed elongated foil members of pliable material substantially impervious to water, and being connected with each other by longitudinally interposed hinge portions of said foil members,*

*(2) said core portions consisting of resilient, soft, and pliable foam rubber or foam plastic,*

*(3) each page being connected to an adjacent page by a pair of respective hinge portions of said two foil members for pivotal movement about an axis transverse of the direction of elongation of said foil members,*

*(4) said foil members having respective rim portions projecting from said face portions is opposite longitudinal directions and transversely of the direction of elongation of said foil members,*

*(5) the rim portions of one foil member being bonded to the rim portions of the other foil member to form*

*a seal between said foil members about the core portions of said pages.*

*4. A book as set forth in claim 3, wherein said axis is substantially perpendicular to said direction of elongation.*

*5. A book as set forth in claim 4, wherein said pliable material is plasticized polyvinyl chloride.*

References Cited

The following references, cited by the Examiner, are of record in the patented file of this patent or the original patent.

UNITED STATES PATENTS

| | | | |
|---|---|---|---|
| 2,390,125 | 12/1945 | Schade | 281—29 |
| 2,484,330 | 10/1949 | Schade | 281—29 |
| 2,765,605 | 10/1956 | Brelsford | 53—180 |
| 2,772,427 | 12/1956 | Rankin | 281—29 X |
| 2,871,639 | 2/1959 | Forgo | 53—180 |
| 3,190,678 | 6/1965 | Peterson | 280—29 |

JEROME SCHNALL, *Primary Examiner.*

UNITED STATES PATENT OFFICE

CERTIFICATE OF CORRECTION

Reissue No. 26,395 May 21, 1968

Friedrich Schneider

It is certified that error appears in the above identified patent and that said Letters Patent are hereby corrected as shown below:

Column 3, line 17 "is" should read -- in --.

Signed and sealed this 16th day of December 1969.

(SEAL)
Attest:

Edward M. Fletcher, Jr.
Attesting Officer

WILLIAM E. SCHUYLER, JR.
Commissioner of Patents